Jan. 6, 1953 A. W. KINGSTON 2,624,232
APPARATUS FOR THE REPRODUCTION OF OPTICAL RECORDS
Original Filed July 21, 1948 5 Sheets-Sheet 1

Arthur William Kingston
INVENTOR

Jan. 6, 1953  A. W. KINGSTON  2,624,232
APPARATUS FOR THE REPRODUCTION OF OPTICAL RECORDS
Original Filed July 21, 1948  5 Sheets-Sheet 2

INVENTOR:
Arthur William Kingston
By Richardson David and Nordon
his ATT'YS.

Jan. 6, 1953            A. W. KINGSTON            2,624,232

APPARATUS FOR THE REPRODUCTION OF OPTICAL RECORDS

Original Filed July 21, 1948            5 Sheets-Sheet 4

INVENTOR
Arthur William Kingston

Jan. 6, 1953     A. W. KINGSTON     2,624,232
APPARATUS FOR THE REPRODUCTION OF OPTICAL RECORDS
Original Filed July 21, 1948     5 Sheets-Sheet 5

INVENTOR:
Arthur William Kingston
By Richardson, David and Nordon
his ATTYS.

Patented Jan. 6, 1953

2,624,232

UNITED STATES PATENT OFFICE 2,624,232

APPARATUS FOR THE REPRODUCTION OF OPTICAL RECORDS

Arthur William Kingston, Denham, England

Original application July 21, 1948, Serial No. 39,915. Divided and this application September 13, 1950, Serial No. 184,604. In Great Britain July 31, 1947

12 Claims. (Cl. 88—16)

1

This invention relates to apparatus for the reproduction of an optical record in the form of a perforated translucent film strip capable of being reeled, the said film strip being contained within a detachable magazine adapted to be mounted on the reproduction apparatus. The invention is especially concerned with cinematograph films, but it is also applicable to other kinds of records, e. g. optical sound record tracks, as well as cinematograph films in combination with optical sound record tracks.

An object of the invention is to enable such a record to be run repeatedly through a machine adapted to use it, without the necessity for the record to be re-threaded through a gate and shifting mechanism.

Another object is to enable such a record bearing strip to be run in either direction at will, e. g. in order to make use of two alternative recorded matters on a single film strip, without the necessity for re-threading.

Another object is to minimise the risk of damage to the record through clumsy handling or interference.

Another object is to avoid, in some circumstances, the need for re-winding of the film strip between runs.

According to the invention there is provided an apparatus for the reproduction of optical records in the form of a perforated film strip or strips, said apparatus including a facing, a light-projecting element projecting from said facing, two continuously rotatable driving coupling members, a film magazine comprising a casing including an apertured member having two spaced apertures positioned to register with two optical records respectively, film guide means for constraining the film to move in a path adjacent the apertures in said apertured member, two opposed and generally flat side walls spaced apart by said apertured member, at least one of said side walls being apertured in the vicinity of the film guide means to permit the insertion of said light-projection element through the apertured wall into a position in the light path through either of the said two apertures in the apertured member, a pair of bobbins mounted for rotation within said casing and each accessible for engagement one at a time with one of said driving coupling members and film feeding means for feeding film from one bobbin towards said film guide means and away from said film guide means towards the other bobbin, said film feeding means being accessible for engagement by the other of said driving coupling members, the magazine being detachably mounted on said facing with the driving coupling members engaged with that bobbin on to which film strip is to be wound and said film-feeding means respectively.

The film guide means comprises a film-gate in the case of cinematograph projection and this film gate is arranged in or adjacent an edge wall of the casing which constitutes the apertured member and which is also further apertured to permit the entry of an element of a film shifting means to engage the perforations of a film strip extending between the bobbins in the casing for shifting the film-strip through the film-gate.

The magazine is usually formed symmetrical with respect to a plane perpendicular and transverse to the middle of the film-gate, the casing being provided with an aperture in each side wall, so that a film, bearing two records side by side and arranged to run in opposite directions, can be run through completely by merely inverting the magazine when the film has run once through the gate.

The reproduction apparatus may also comprise control means including a main control member such as a lever, operable by hand, to effect all or a number of the operations necessary to bring the parts of the apparatus into suitable cooperative relationship with one another when the magazine is mounted thereon whereby starting is made a simplified and foolproof operation.

Such control means may be a pivoted lever adapted to clamp or retain the magazine in the required precise position on the facing and also arranged to effect the engagement of the film driving means in the magazine with the driving connections on the facing as said lever is moved into the position to clamp the magazine in position on the facing.

A movable shutter is conveniently provided on the magazine for closing the exposure apertures in the magazine wall whilst the magazine is not in use and movement of the control means or clamping lever may also be utilised to move said shutter to open the exposure aperture, when the magazine has been placed on the facing and the control means or clamping lever is moved into the appropriate position.

The film shifting means for moving the film through the film-gate is mounted in such a manner as to be retractable from the operative position of shifting engagement with the film extending through the film-gate, so as to offer no obstruction when a magazine is to be mounted upon or removed from the facing, and the movement of said film shifting means between the operative and retracted positions may also be effected by movement of the control means or magazine clamping lever.

Alternatively mounting of the magazine may be such as to require movement of the magazine towards the film-shifting mechanism as a final step in the operation of locating the magazine in position on the facing, and away from the film-shifting means as a first step in the operation of removing and changing or inverting the magazine on the facing, and again these movements of the magazine towards and away from the film-shifting mechanism may be effected by movement of the control means or magazine clamping lever.

The invention is illustrated by way of example in the accompanying drawings as applied to a cinematograph projection apparatus of a small portable type for use in the home, and also as applied to an optical sound film reproducing apparatus.

Figure 1:
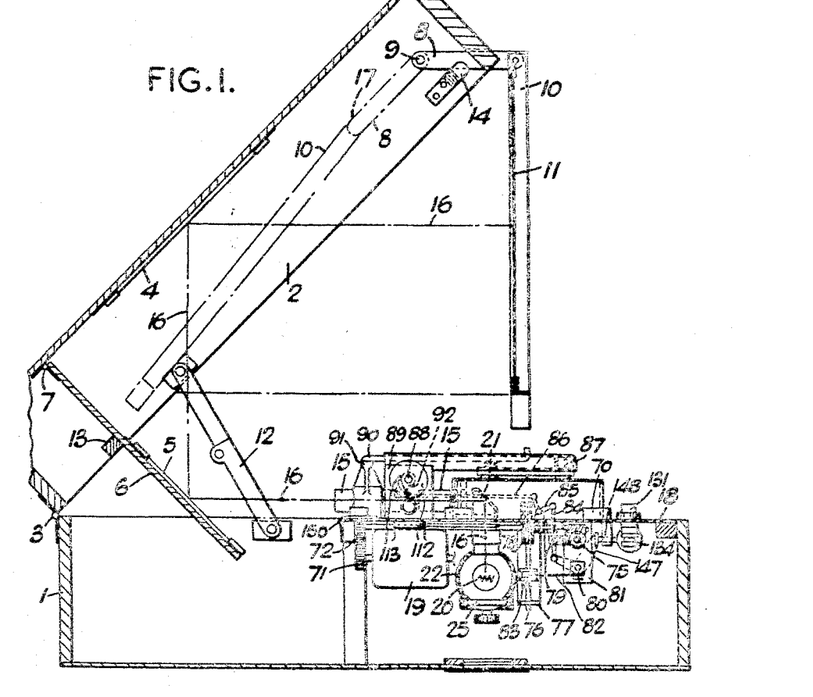
Fig. 1 is a view in part sectional side elevation of a complete cinematograph projection apparatus including a portable container therefor and embodying a viewing screen.
Figures 2, 9:
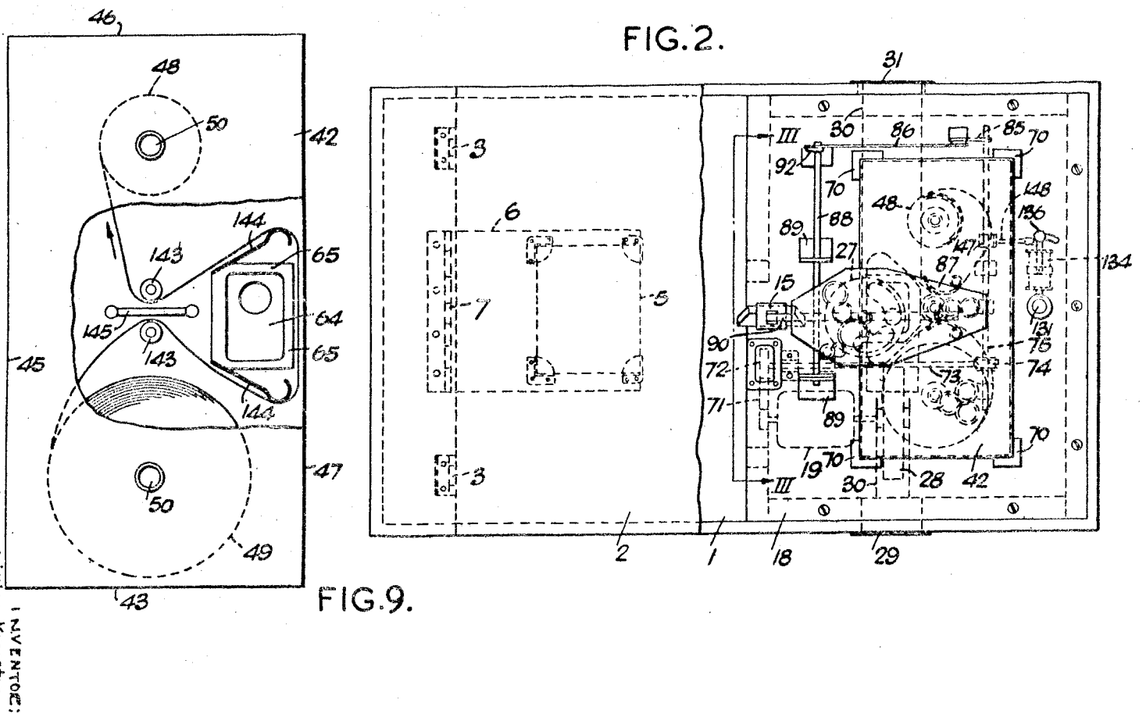
Fig. 2 is a plan view of Fig. 1 with a part of the lid of the container omitted.
Fig. 9 is a plan view of one form of the magazine, a part of one side wall being broken away.

Referring to Figs. 1 and 2 the projection apparatus illustrated comprises a box 1 having a lid or cover 2 hinged at 3.

Within the lid 2 are mounted a pair of reflecting mirrors 4 and 5, the mirror 4 being fixed in position in any convenient manner as shown and the mirror 5 being carried by a support 6 hinged within the lid at 7 so as to be capable of being housed therein when the lid 2 is in the closed position.

Near the free end of the lid 2 are mounted a pair of links 8 hinged at one end to the lid at 9 and at the other end to two corners of a lightweight frame 10 carrying a translucent screen 11. In the open position of the lid as shown in Fig. 1, corresponding to the position of operation of the projection apparatus, the lid 2 takes a fixed angular position relative to the box 1 as determined by a lid stay 12 of known form, the pivoted mirror 5 takes a position of appropriate angularity with reference to mirror 4, by engagement of the support 6 of mirror 5 with stops 13 in the lid 2, and the links 8 are held by clips 14 in an outwardly extending horizontal position, with the frame 10 and screen 11 suspended vertically from their ends. The optical projecting system of the projector is indicated by 15 and the light path from the optical system is indicated generally by the line 16 in Fig. 1 and it will readily be seen that the reproduced pictures may be viewed from the outer side of the translucent screen 11.

When the apparatus is not in use the pivoted mirror 5 is folded into the lid 2 and the links 8 are released from the clips 14 and moved about their pivots 9 to the position shown in dotted lines at 17 so that the frame 10 and screen 11 are housed within the lid.

Within the box 1 is mounted a platform 18 covering approximately one half of the length of the box at the outer end thereof, and from the underside of the platform 18 is suspended an electric motor 19 forming a source of drive for the winding and shifting of the film, and a projection light source 20. Above an aperture in the platform 18 and over the light source 20 is mounted a reflecting prism 21 adapted to reflect light from the light source 20 generally horizontally through the optical projection system 15 which may be of conventional form or may include an erecting prism, according to the disposition of the pictures on the film, and is also carried upon the platform 18.

Figure 3:
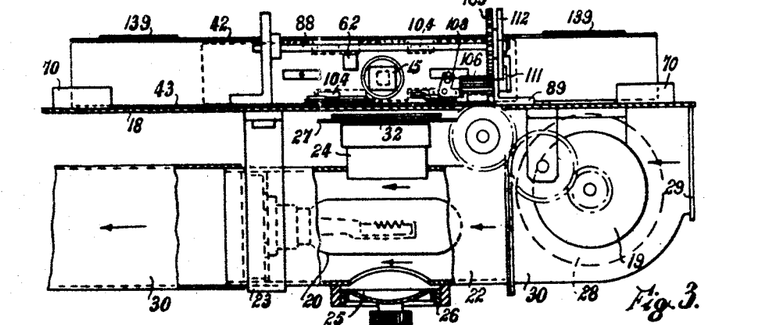
Fig. 3 is a view in end elevation on the line III—III of Fig. 2 and on an enlarged scale.

The light source 20 is an electric lamp enclosed within an open ended cylindrical container 22 (Fig. 3) supported by a strap 23 from the platform 18, the container 22 being provided with a pair of diametrically opposed apertures in its wall, the axes of which are vertically aligned, the upper aperture being fitted with a tube 24 housing a condenser, said tube extending to within a short distance of the platform 18, whilst the lower is fitted with a concave mirror 25 adapted to reflect light upwards towards the prism 21. The mirror 25 is retained in position by means of a screw ring 26 permitting removal of the mirror for cleaning.

Beneath the platform 18 is mounted a rotary obturator 27 of well known form for the intermittent interruption of the light path between the upper end of the condenser tube 24 and the prism 21.

The driving motor 19 is preferably provided with an air impeller 28 on one end of its shaft shown diagrammatically in dotted lines in Fig. 2, adapted to draw air through an inlet aperture 29 provided in the wall of the box 1, and the impeller 28 is housed within a duct 30 leading to the container 22 and thence to an outlet 31 at the opposite side of the box 1. By this means a stream of air is directed on to the light source when the apparatus is in use, so that heat generated at the light source is dissipated.

Figure 10:
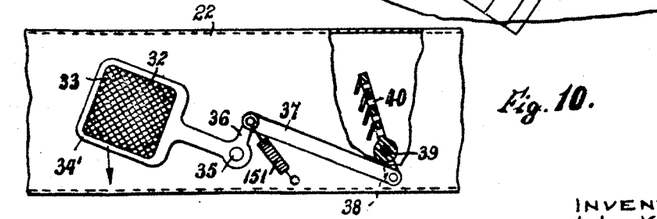
Fig. 10 shows a detail.

In some cases there may be provided a displaceable heat shield 32, Fig. 10, disposed between the obturator 27 and the underside of the platform 18, to absorb heat generated by the lamp at the start of a projection operation or during the speeding up of the motor 19.

The displaceable shield 32, Fig. 10, comprises a small sheet of metal gauze 33 carried in a light frame 34 pivoted at 35 on the upper wall of the container 22 so that the gauze 33 may cover or uncover the light aperture through the platform 18. A crank arm 36 extends from the frame 34 and is pivotally connected through a link 37 with a lever 38 extending from a pin 39 pivoted in the wall of the container 22 and extending into the interior of the latter, the part of the pin 39 within the container carrying a wind vane 40. A tension spring 151 is provided to bias the frame 34 into the shielding position in register with the end of the tube 24, in which position the gauze will intercept heat generated at the lamp 20 before the cooling air stream is built up by the motor 19 and impeller 28. Thereafter, the wind vane 40 is moved about its pivot 39 by the pressure of the air stream through the lamp container 22 and the shield 32 is moved to uncover the light aperture through the platform.

Figure 12:
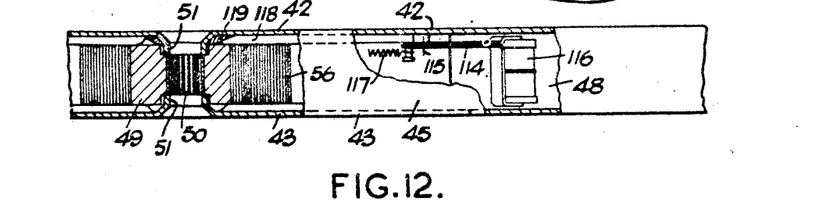
Fig. 12 is a view in sectional elevation of a part of the magazine and corresponding to Fig. 11.

The film magazine is in the form of a shallow casing comprising two main parallel side walls 42 and 43, Fig. 12, in the case illustrated of elongated rectangular form, and four peripheral edge walls 44, 45, 46 and 47. It is to be understood however, that the magazine may be of other than rectangular shape e. g. oval or elliptical. One of the side walls 42 or 43 and the edge walls 44—47 may be formed as a single integral moulding or as an assembly of pressings or stampings and the other wall 42 or 43 as a detachable plate, the whole being kept assembled by screws (not shown).

In the magazine casing are mounted a pair of film bobbins 48 and 49, one at each end, and the axles of these bobbins are formed by internally splined tubes 50 (Fig. 12) rotatable in bearings formed by inwardly directed rims 51 surrounding apertures formed in the side walls 42, 43 of the casing, the arrangement being such as to afford access to the splined interiors of the tubes 50 from the exterior of the magazine casing.

At the middle of one edge wall 47 of the casing, which will be termed the front wall (Figs. 4 and 6), is mounted a film-gate constituted by an apertured flat blade 52 pressed by springs 53 away from a fixed plate 54 carrying said springs 53, towards an apertured plate 55 disposed close to but slightly spaced from the inner surface of the front wall 47 of the magazine casing, which is apertured for register with the gate apertures in the plates 54 and 55 and blade 52.

The magazine illustrated by way of example is adapted for use with a film strip 56 (Fig. 7) bearing two sets of pictures 57 and 58 alongside one another and running in opposite directions along the film, and two sets of registering gate apertures are provided in the parts 52, 54, 55 forming the film-gate as well as in the front wall 47 of the magazine casing. The two sets of apertures may be disposed in alignment with one another at the middle of the film-gate and on opposite sides of the median plane parallel to the side walls of the casing, or, as illustrated in Fig. 5, on opposite sides of both that median plane and the centre line of the film-gate at right angles to that plane.

Figure 5:
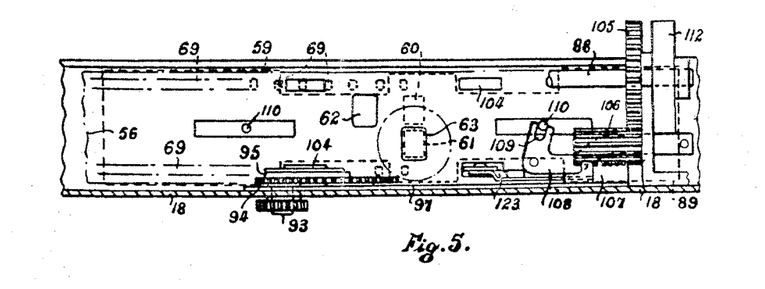
Fig. 5 is a view in elevation on a still larger scale showing a part of the edge wall of the magazine at which the film-gate is located.

Between the plate 55 and the inner surface of the front wall 47 of the casing is mounted a sliding shutter 59 (Figs. 5 and 6) having two apertures 60 and 61 and slidable between two extreme positions in each of which one or the other of the exposure apertures through the film-gate and the casing wall 47, and indicated by 62 and 63 in Fig. 5, is in register with one of the apertures 60 and 61 in the shutter 59 and is therefore uncovered, and the other aperture 62 or 63 is covered by the shutter, whilst in an intermediate position of the shutter 59 the apertures 62 and 63 are both covered by the shutter 59. The last mentioned position is that occupied by the shutter 59 when the magazine is not in use.

Behind the film-gate the two side walls 42 and 43 of the casing are each provided with an aperture 64 and a flange 65 formed for example by moulding integrally with one of the walls 42 or 43, closes the gap between these apertures 64 at their sides and rear.

Behind the flange 65 and between the film bobbins 48 and 49 is mounted a toothed film feeding sprocket 66 (Fig. 4), having a tubular axle 67 journalled in bearings in the side walls 42 and 43 of the casing, in a manner similar to that previously described in respect of the axles 50 of the bobbins 48 and 49. The axles 50 of the two bobbins 48 and 49 and the axle 67 of the sprocket 66 are disposed parallel to and in alignment with one another and the tubular axle 67 of the sprocket 66 is also internally splined. A spring loaded arcuate fence 68 is provided at each side of the sprocket 66.

Figure 6:
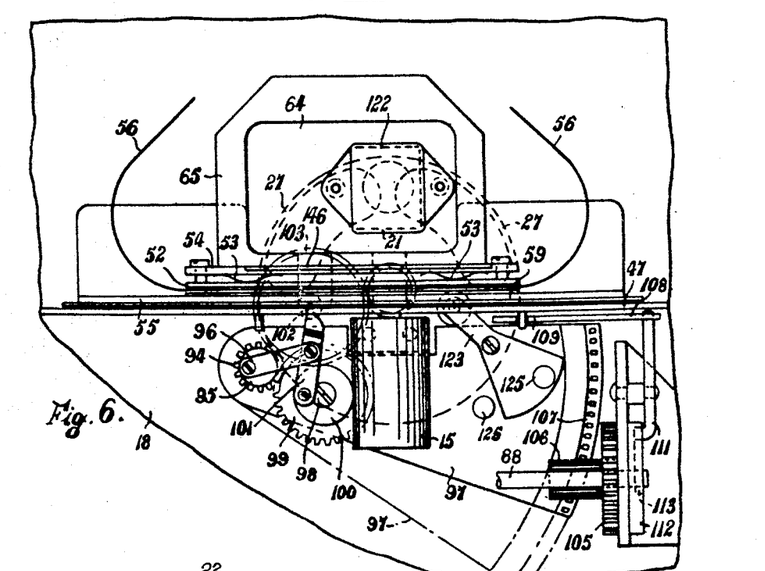
Fig. 6 is a plan view corresponding to, and on a similar scale to Fig. 5, and also showing the film-shifting means.

In the preferred construction a second or inner shutter 146 is provided on the inner side of the film-gate as shown in Fig. 6 to exclude the entry into the magazine of dust from the interior of the space within the flange 65 when the magazine is not in use, this inner shutter being apertured in a manner similar to the primary shutter 59 and being connected to the primary shutter 59 in any convenient manner for movement in unison therewith.

Figure 4:
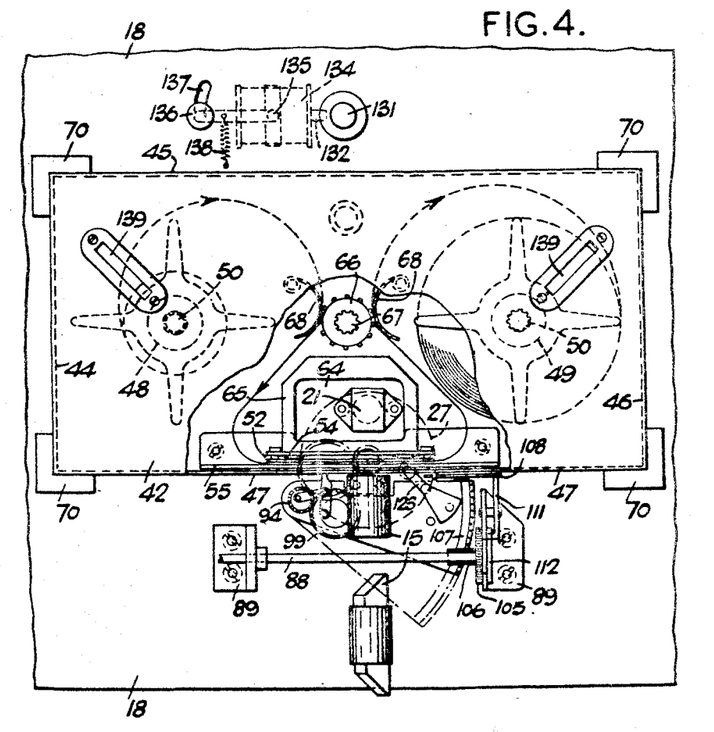
Fig. 4 is a plan view of Fig. 3 on a similar enlarged scale with part of one flat side of the magazine shown cut away.

The film 56 runs off one of the bobbins 48 or 49, whichever is the trailing bobbin, towards the rear of the magazine casing as shown by the arrows in Fig. 4, forwards between one side of the sprocket 66 and one fence 68, then in a free loop to one end of the film-gate, through the film-gate (in which it is fed with intermittent motion by means yet to be described), and is finally led between the other side of the sprocket 66 and the other fence 68 onto the other or take-up bobbin 48 or 49.

The film 56 in the case illustrated (see Fig. 7) is provided with perforations 69 along both margins but the driving sprocket 66 need engage with one set of perforations only.

Alternatively with a "twin" film such as that described above a single row of the perforations 69 may be provided along the centre line of the film between the two sets of pictures for cooperation with a sprocket 66 having one set of teeth only.

The magazine is mounted with one or the other of the walls 42 or 43 (43 in the case illustrated), in engagement with a facing formed by the platform 18, being accurately located thereon by suitable means such as corner pieces 70 fixed to the platform 18 (Fig. 4). Alternatively the magazine may be located by spring loaded means urging the magazine against suitable abutments on the platform. In the mounted position of the magazine on the facing formed by the platform 18, the reflecting prism 21 extends into the interior of the magazine casing through the aperture 64 in one or the other of the side walls 42 or 43 whichever is the lower, and into the space bounded by the flanges 65 behind the film-gate at the front wall 47 of the magazine.

The means whereby the film bobbins 48 and 49 and the sprocket 66 are rotated to move the film 56 is as follows:

The shaft of the motor 19 is geared through meshing pinions 71, 72, to a longitudinal shaft 73, Fig. 2, carried in bearings beneath the platform 18 and the shaft 73 is geared through a worm gear 74 with a cross shaft 75 also carried in bearings beneath the platform 18. At one side of shaft 75 are mounted two spindles 76, of which one only is shown in Fig. 1 of the drawings, arranged for vertical movements in suitable guides 77, these two spindles 76 being in axial alignment respectively with that one of the two axles 50 of the bobbins 48 and 49 which is functioning as the take-up bobbin and the axle 67 of the sprocket 66.

Each spindle 76 at its upper end is provided with a long pinion 78 and is adapted to be driven through a suitable gear train 79 from the common cross shaft 75.

The dimensions of the long pinions 78 are selected so that they are capable of making keyed engagement with the splined tubular axles 50 and 67 when the spindles 76 are raised, through suitable apertures in the platform 18 beneath the magazine.

A rocking bar 80 is carried in brackets 81 depending from the platform 18 and from this bar extend leaf springs 82, the free ends of which engage in grooves in collars 83 fixed on the spindles 76.

It will readily be seen that by rocking the bar 80 clockwise in Fig. 1 the spindles 76 will be raised by the leaf springs 82. Should the pinions 78 not be in exact register with the splined tubular axles 50 or 67 engagement may be delayed, but the leaf springs 82 will remain under load so that full engagement will take place when rotation of the spindles 76 commences.

The rocking movements are imparted to the bar 80 through a linkage comprising a rod 84, a bell crank 85 and a horizontally movable bar 86, the latter being movable longitudinally through control means yet to be described.

Retention of the magazine in the mounted position on the platform 18 is by means of a clamping lever 87 fixedly mounted on a spindle 88 (Fig. 2), rotatable in spaced brackets 89 on the platform 18. This lever 87 is capable of being rocked about the axis of spindle 88 to an approximately vertical position to permit mounting or removal of a magazine, or to an approximately horizontal position as shown in Fig. 1 to engage and hold the magazine in place on the platform 18. A sliding bolt 90 is provided on the lever 87 the nose of which engages above an abutment 91 to retain the lever 87 in the magazine clamping position as shown in Fig. 1.

This lever 87 in the case illustrated also constitutes the main control or setting member for bringing about the co-operative disposition of parts necessary for carrying out projection after the magazine has been mounted on the facing.

One end of the spindle 88 carrying the lever 87 carries a short lever 92 (Figs. 1 and 2), connected with the above described bar 86 of the linkage for raising or lowering the spindles 76, the arrangement being such that as the clamping lever 87 is turned upwards i. e. counter-clockwise in Fig. 1, the spindle 88 is rocked in the brackets 89 and the rod 86 is moved longitudinally in the direction permitting the spindles 76 to take their lowered position in which the long pinions 78 are out from engagement with the take-up bobbin and the film driving sprocket of the magazine.

Upon lowering the clamping lever 87 into the position shown in Fig. 1 for holding a magazine in position on the platform 18, the rod 86 is drawn in the reverse direction to rock the bar 80 and the leaf springs 82 to raise the spindles 76 and bring about the above described driving connection between the spindles 76 and the take-up bobbin, and the winding sprocket in the magazine respectively.

The means for effecting the intermittent shifting of the film 56 through the film-gate of the magazine will now be described. In a bearing in the platform 18, Figs. 5 and 6, is rotatably mounted a spindle 93. This spindle 93 carries a gear wheel 94 and a disc 95 to which is pivotally connected eccentrically, one end of a link 96.

A plate 97 is mounted at one of its ends for pivotal movement about the axis of the spindle 93.

In bearings in the plate 97 is mounted a rotatable spindle 98 provided with a gear wheel 99 in constant mesh with the gear wheel 94 on the spindle 93; its spindle 98 is also provided with a disc 100 on which is eccentrically and pivotally mounted one end of a lever 101 the free end of which is in the form of a claw 102 suitable to engage the perforations 69 in the film strip 56. The end of the link 96 is pivotally connected to a point intermediate the ends of the lever 101.

The plate 97 is arranged for movement in a plane generally parallel to that of the platform 18, about the axis of spindle 93 between one position in which it lies close to the front of the magazine as shown in full lines in Fig. 6 and another position in which it is away from the front of the magazine as shown in dotted lines in Fig. 6. The gear wheel 94 on spindle 93 is in constant mesh with a drive pinion 103 driven through suitable gearing from the motor driven shaft 73, this drive pinion 103 being also in constant mesh with the drive gear train for the obturator 27.

With a magazine in position and the apparatus in operation, the plate 97 occupies the position close to the magazine and the claw 102, while making compound oscillatory movements due to the rotation of the geared discs 95 and 100, in a manner well understood in the art of cinematography, enters slots 104 provided in the front wall 47, the shutter 59, the plate 55, the blade 52 and the back plate 54 of the film-gate of the magazine and if necessary the inner shutter 146, and engages successive perforations 69 on the film strip 56 to impart the required step-by-step shifting movement of the film through the film-gate. When reproduction or projection is finished or is to be interrupted, to permit a change or inversion of the magazine, the plate 97 is moved about the axis of spindle 93 to the position withdrawn from the magazine, in which the claw 102 is incapable of engaging through the wall and film-gate of the magazine and thus no obstruction is offered by the claw 102 to mounting and dismounting of a magazine.

The described movements of the plate 97 are also effected by the movements of the magazine clamping lever 87. For this purpose, the spindle 88 carrying the lever 87 bears a pinion 105 rotatable by and with the spindle as the lever is moved, this pinion 105 meshing with a second pinion 106 engaging a rack 107 on the plate 97. By this means as the clamping lever 87 is raised to release the magazine to permit its removal from the platform 18 the plate 97 is moved away from the magazine, whilst upon return movement of the clamping lever 87 to the position shown in Fig. 1 to clamp the same or another magazine on the platform 18, the plate 97 is returned to the position near to the magazine in which the claw 102 is capable of entering the film-gate and engaging the perforations 69 of the film. A flexible or yielding drive may be provided between the spindle 88 and the pinion 105 e. g. by the provision of a spring coupling between these parts, so that the plate 97 may be moved with certainty to the full home position adjacent the magazine before the clamping lever 87 reaches its extreme position for clamping engagement with the magazine.

The movements of the clamping lever 87 and also be utilised to move the sliding shutters 59 and 146 to cover or uncover the exposure aperture of the magazine.

For this purpose there is mounted on the platform 18 a pivoted bell crank lever 108 (Figs. 3, 4, 5 and 6), having an open notch 109 with divergent sides formed in the extremity of one of its limbs, adapted to receive a lug 110 extending from the shutter 59 through a slot in the front magazine wall 47. The end of the other limb of the bell crank lever 108 is apertured for the reception of the end of a lever 111 pivoted at a point intermediate its ends on one of the brackets 89. On the end of the spindle 88 carrying the magazine retaining lever 87 is fixedly mounted a disc 112 provided with a cam slot 113 in which engages the bent end of the lever 111 remote from the bell crank 108.

With the clamping lever 87 raised in preparation for the mounting of a magazine on platform 18, the slotted disc 112, lever 111 and bell crank lever 108 are in positions such that when a magazine, with its shutters 59 and 146 in the aperture covering position, is placed on the platform 18 the lug 110 engages in the notch 109 of the bell crank lever 108. Movement of the lever 87 downwards into the magazine clamping position rotates the disc 112 to rock levers 111 and 108, the latter to an extent to move the shutters 59 and 146 by a distance to bring one or other of the apertures 60 or 61 in the front shutter 59 and the corresponding aperture in the rear or inner shutter 146 into register with the appropriate magazine and film-gate aperture 62 or 63 (Fig. 5).

The magazine is preferably provided with braking or restraining means for preventing movement of the film 56 or the bobbins 48, 49 within the casing of the magazine when the latter is not in use, such braking means being operable to release the film for movement as the magazine is mounted on the platform.

Figure 11:
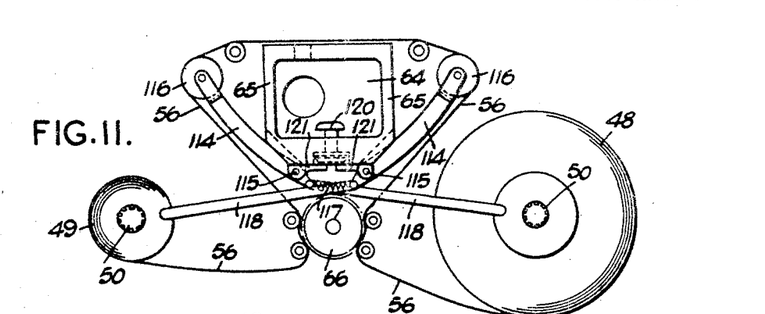
Fig. 11 is a view in sectional plan showing further features of the magazine.

One form of such braking means is illustrated in Figs. 11 and 12 and comprises a pair of levers 114 mounted on spaced pivots 115 in the magazine and carrying rollers 116 adapted to engage in the film loop at each side of the film-gate, said levers 114 being connected at their ends remote from the rollers by a tension spring 117 whereby the film loop is tensioned and held frictionally against movement in the film-gate. The ends of the levers 114 near the tension spring 117 are pivotally connected with a pair of guided crossing bars 118 which extend between one of the side walls 42 or 43 of the magazine casing, and the flanges of the bobbins 48 and 49. The ends of the bars 118 are adapted, under the urge of the spring 117, to engage with wedge-section portions 119 of the magazine casing whereby the bars 118 are thrust into frictional engagement with the edge of the roll of film or with the flanges of the bobbins.

Release of the braking devices is effected by rocking the levers 114 as the magazine is mounted on the platform 18. For this purpose a taper-headed sliding stud 120 is mounted for sliding movement in the rear wall of the flange 65 closing the space between the apertures 64 in the side walls of the magazine casing, this stud 120 making engagement with abutments 121 provided on the levers 114. The arrangement is such that as the light-reflecting prism 21 enters an aperture 64 in the magazine casing as the magazine is mounted on the platform or facing 18, the prism housing 122 engages the stud 120 to move it rearwards in the wall of flange 65 so that the levers 114 are rocked against the spring 117, the tension on the film loop being thereby released and the crossing bars 118 withdrawn from the shaped portions 119 of the magazine casing wall to free the film spool or the bobbin flanges.

Means are also provided to stop the apparatus automatically when projection of a film has been completed.

On the plate 97 is pivotally mounted a wiper 123 one end of which is adapted, when the plate 97 is in the position close to the magazine i. e. when the machine is in operation, as shown in full lines in Fig. 6, to extend, under the urge of a biassing spring, through an aperture in the front wall 47, and the shutter 59 of the film-gate and into contact with the edge, usually the perforated edge, of the film 56. The end of the wiper 123 is incapable of passing through the perforations 69 of normal size in the film but one or a number of elongated perforations 124 are provided near the end of the film, of a size permitting the end of the wiper 123 to pass through and also through further apertures in the blade 52 and the back plate 54 of the film-gate.

Thus when the end of the film 56 approaches close to the gate and an elongated perforation 124 in the film comes into register with the end of the wiper 123 the wiper is permitted to rock under the urge of the biassing spring, about its pivot on plate 97, and this movement of the wiper is utilised to open or close contacts 125 in an electrical control circuit to stop the apparatus.

Figures 7, 8:
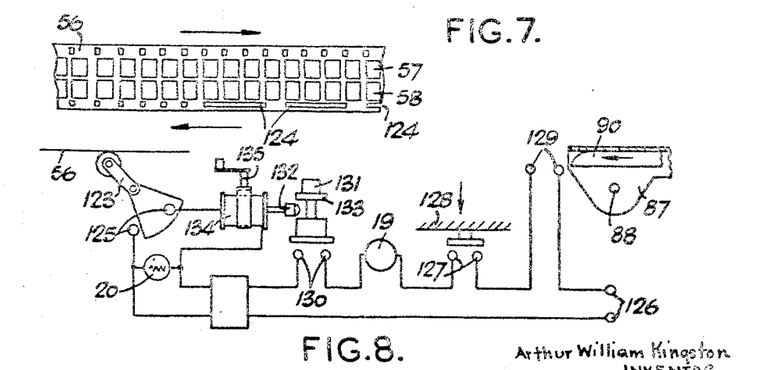
Fig. 7 shows an end portion of one form of cinematograph film suitable for use with the invention.
Fig. 8 is a diagrammatic representation of an electrical control circuit.

A suitable control circuit is illustrated diagrammatically in Fig. 8. In this circuit 126 are the main terminals and starting of the motor 19 is dependent upon a sequence of circuit closing operations including closing of contacts 127, conveniently located on the platform 18, by the operation of placing the magazine 128 in position on the platform, closing of contacts 129 by shooting the bolt 90 on the magazine retaining lever 87 into the locking position, and the closing of contacts 130 by means of a suitably located start button 131 adapted to be depressed against a return spring (not shown). A detent 132 is provided for engagement over a projection 133 on the start button 131 to maintain the latter in its lowered position after depression, said detent 132 being under the control of a solenoid or equivalent electrical relay 134.

The relay 134 is caused to operate, when the wiper 123 is permitted to rock in the manner previously described to close contacts 125, to withdraw the detent 132 from the projection 133 on start button 131, so that the latter is permitted to rise to interrupt the circuit to the motor 19 as well as to the light source 20.

The solenoid 134 is pivotally mounted at 135 as shown in Fig. 4 and is capable of being rocked about its pivot at any time by hand by means of a knob 136 on a pin connected with the solenoid body and extending through a slot 137 in the platform 18, to disengage the detent 132 from projection 133 and permit start button 131 to rise to break the electrical circuit. The solenoid is maintained in its normal or operative position by means of a tension spring 138 holding the pin carrying the knob 136 against one end of the slot 137.

Means are also provided in the form of a cam 147, Fig. 2, on the bar 80, and a push rod 148 to urge the pivoted solenoid 134 into the position where the detent is disengaged from the projection 133 on the pin carrying the finger knob 131, as the magazine retaining lever 87 is raised and to retain the solenoid 134 in that position while the lever 87 remains raised.

Thus if the finger knob is inadvertently depressed whilst there is no magazine on the facing it will not be retained depressed, so that premature starting of the apparatus on placing a magazine in position cannot occur.

When a magazine is to be used it is necessary for the operator to know on which of the bobbins within the magazine the film is reeled. For this purpose windows such as 139, Fig. 4, may be provided in one or both of the side walls 42 and 43 through which the presence or absence of a film at a bobbin can be observed.

Alternatively an observable indicator (not shown), may be provided, the position of which is varied as the diameter of the film reel wound on one bobbin changes.

Figure 13:
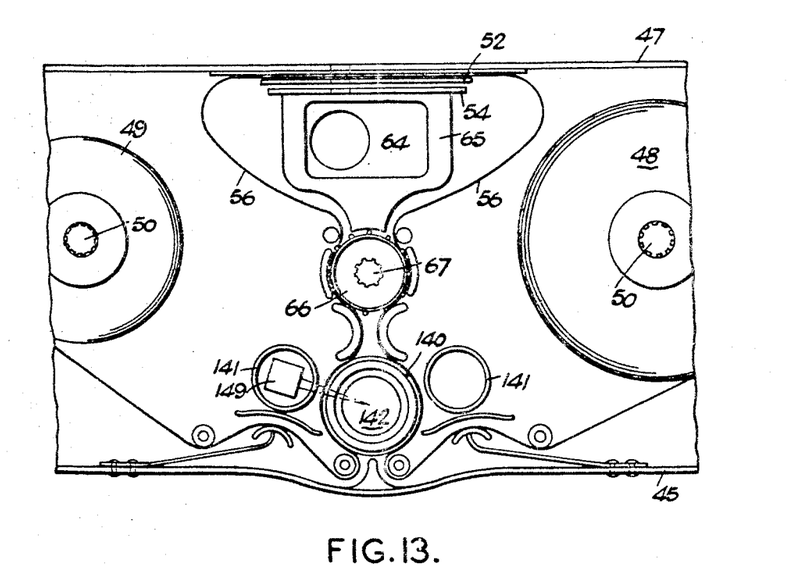
Fig. 13 is a plan view showing a form of film-shifting means for use with an optical sound film record.

In Fig. 13 is illustrated a form of magazine for use with a combined optical sound and picture film record. This magazine embodies the essential features of the magazine previously described including a film driving sprocket 66 and a film-gate through which the film is shifted with intermittent motion for the purpose of the picture projection.

Within the magazine behind the sprocket 66 is mounted a tubular friction guide member 140 rebated on the exterior around which the film is caused to move with its edges in surface contact with the parts of member 140 at each side of the rebate, on its way from the film bobbin 49 to the driving sprocket 66 and thence to the gate. Thus in operation the film is moved over the guide member 140 at a constant continuous speed, on its way to the picture film-gate through which it is moved intermittently by the claw 102 as previously described.

The interior of the guide member 140 is accessible through both the side walls 42 and 43 of the magazine and two further lined housings 141 are provided in the magazine in symmetrical disposition on each side of the guide member 140, both being accessible through the two side walls 42 and 43.

On the facing platform 18 are mounted a photo-electric cell 142 in a position for entry into the interior of the guide member 140 as a magazine is placed in position on the platform 18, and also a light source 149 for entry into one or other of the housings 141 according to which side 42 or 43 of the magazine is lowermost, and in a manner similar to that previously described in connection with the prism 21. The walls of the housings 141 and also of the guide member 140 are provided with two spaced apertures permitting light from the light source 149 to traverse the translucent sound record on the film strip and reach the photo-electric cell 142. The latter is connected with a suitable amplifier in the usual well known manner.

In the case of a film strip bearing sound records only, the film-gate in the front wall of the magazine will be omitted and movement of the film strip carried out entirely by the sprocket 66, film guide means being provided within the magazine to cause the film to move in a path adjacent the apertures in the apertured member.

Whilst in the preferred example described and illustrated tthe magazine is provided with apertures 64 in both its side walls 42 and 43 and the magazine is arranged to be inverted after the film has been run through once, in order that the film may be run through a second time in the same direction relative to the optical system 15 to project the second set of pictures, it will be understood that in some cases one aperture 64 at one side only is provided and instead of inverting the magazine in order to project the second row of pictures (or to reproduce a separate optical sound record) the magazine may be maintained in its original mounted position and the direction of movement of the film past the optical system reversed by the use of a suitable reversing gear of any convenient form in the driving train and a third spindle 76 with a long pinion or splined end 78 for engagement with the splined hollow axle of the formerly trailing, and now take-up, bobbin, the reflecting prism 21 in such case being adjustable in height relative to the platform 18 and the magazine in order to project the light beam through the alternative vertically spaced (and in this case vertically aligned) gate apertures according to which row of pictures is to be projected (or which record is to be reproduced).

Slippable friction coupling members of known form (not shown) are embodied in the drives to the bobbins to allow for changes in peripheral speeds of the reeled film and the driving sprocket as the diameter of the film reel increases.

In some cases e. g. where small size films of short length are to be employed, the film driving sprocket 66 of the previously described construction may be omitted, and an arrangement employed such as that shown in Fig. 9, in which the film is moved through the gate by the intermittently engaging claw 102 and reeled up by the driving take-up bobbin, the film in its passage towards and away from the gate passing guide rollers 143 disposed relatively close to one another, and around a pair of yielding spring arms or guides 144 disposed one at each end of the film-gate whereby the intermittent pull of the claw on the film at the film-gate is smoothed and the motion of the bobbins remains substantially continuous. A rubbing plate 145 is provided between the rollers to prevent the two ends of the film loop from rubbing upon one another.

Instead of the film-shifting claw 102 and the driving parts therefor being carried upon a movable support such as the plate 97, to permit the retraction of the claw to a position remote from a mounted magazine, the magazine itself may be arranged to be moved on the facing in the course of the mounting or dismounting operations, towards and away from the claw. For example the magazine may be arranged to be placed on the facing 18 in a position against a spring-loaded or other yielding stop in which position it is spaced from the claw and thereafter urged forward to an accurate pre-arranged position for co-operation with the film-shifting claw 80, being held in that position by the clamping lever 87. In such case the lever 87 may be provided with a cam or like abutment surface for engagement with a shaped part of the magazine casing, to urge the magazine into said pre-arranged position as the clamping lever 87 is moved into the magazine clamping position and vice versa.

The platform 18 is preferably mounted in the box 1 so as to be tiltable upwards about a pivot mounting 150 at the inner end to permit access to the underside for inspection of parts, lamp replacement and so on.

The present application is a division of applicant's pending application Serial Number 39,915, filed on July 21, 1948.

I claim:

1. Apparatus for use with a detachable film magazine, containing therein at least one spool, bearing film, and for the reproduction of optical records in the form of a perforated film strip, said apparatus including a light source, a facing for the reception of said detachable film magazine, a continuously rotatable driving coupling member for engagement with said spool within said film magazine, a light-reflecting element projecting from said facing in a position to lie at least partly within said film magazine located in an operating position on said facing and to reflect light from said light source through said film in said magazine, film-shifting means including a support and a claw mounted for oscillatory movement on said support for engaging the perforations of said film to move the film intermittently through the apparatus, a movable member for retaining said magazine in a fixed position on the facing and means linking said movable member with the support of said film-shifting means, the arrangement being such that movement of said movable member into a position for retaining said magazine on said facing also moves the support of said film-shifting means to the position in which its claw can engage perforations of said film within the magazine.

2. Apparatus for use with a detachable film magazine, containing therein at least one spool, bearing film, and for the reproduction of optical records in the form of a perforated film strip, said apparatus including a light source, a facing for the reception of said detachable film magazine, a continuously rotatable driving coupling member for engagement with said spool within said film magazine, means enabling said driving coupling member to be moved between a retracted position and a position in which it projects from said facing, a light-reflecting element projecting from said facing in a position to lie at least partly within said film magazine located in an operating position on said facing and to reflect light from said light source through said film in said magazine, film-shifting means including a support and a claw mounted for oscillatory movement on said support for engaging the perforations of said film to move the film intermittently through the apparatus, a movable member for retaining said magazine in a fixed position on the facing, means linking said movable member with the means for moving said driving coupling member between its two positions and means linking said movable member with the support of said film-shifting means, the arrangement being such that movement of said movable member into a position for retaining said magazine on said facing also moves the support of said film-shifting means to the position in which its claws can engage perforations of said film within the magazine and raises said driving coupling above said facing.

3. Apparatus according to claim 2, including two retractable driving coupling members each adapted to be raised to its operative position by movement of said movable member into its position for retaining said magazine on the facing.

4. Apparatus for use with a detachable film magazine, containing therein at least one spool, bearing film, and for the reproduction of optical records in the form of a perforated film strip, said apparatus including a light source, a facing for the reception of said detachable film magazine, a continuously rotatable driving coupling member for engagement with said spool within said film magazine, a member for co-operation with said magazine to locate said magazine in the required position on said facing, an electric driving motor, and current-supplying circuit, contact means adapted to interrupt the circuit for supplying current to said electric motor, a light-reflecting element projecting from said facing in a position to lie at least partly within said film magazine located in an operating position on said facing and to reflect light from said light source through said film in said magazine, film-shifting means including a support and a claw mounted for oscillatory movement on said support for engaging the perforations of said film to move the film intermittently through the apparatus, a movable member for retaining said magazine in a fixed position on the facing and means linking said movable member with the support of said film-shifting means, the arrangement being such that movement of said movable member into a position for retaining a magazine on said facing also moves the support of said film-shifting means to the position in which its claw can engage perforations of said film within the magazine and actuates said contact means to complete the circuit for supplying current to said motor.

5. Apparatus for use with a detachable film magazine, containing therein at least one spool, bearing film, and for the reproduction of optical records in the form of a perforated film strip, said apparatus including a light source, a facing for the reception of said detachable film magazine, a continuously rotatable driving coupling member for engagement with said spool within said film magazine, a plurality of stop members fixed to said facing for co-operation with said magazine to locate said magazine in the required position on said facing, an electric driving motor and current-supplying circuit, contact means adapted to interrupt the circuit for supplying current to said electric motor, a light-reflecting element projecting from said facing in a position to lie at least partly within said film magazine located in an operating position on said facing and to reflect light from said light source through a film in said magazine, film-shifting means including a support and a claw mounted for oscillatory movement on said support for engaging the perforations of said film to move the film intermittently through the apparatus, a movable member for retaining said magazine in a fixed position on the facing, means linking said movable member with the means for moving said driving coupling member between its two positions and means linking said movable member with the support of said film-shifting means, the arrangement being such that movement of said movable member into a position for retaining said magazine on said facing also moves the support of said film-shifting means to the position in which its claw can engage perforations of said film within the magazine, actuates said contact means to complete the circuit for supplying current to said motor and raises said driving coupling above said facing.

6. Projection apparatus for the reproduction of optical records in the form of a perforated film strip bearing two optical records side by side and arranged running in opposite directions on the film strip, said projection apparatus including a facing, a light-projecting element projecting from said facing, a driving coupling member, film-shifting means including a support and a claw mounted for oscillatory movement on said support for engaging the perforations of the film to move the film intermittently through the apparatus, a film magazine comprising a casing including an edge wall having two spaced apertures positioned to register with the two optical records on the film and two further spaced apertures positioned to register with the perforations on the film, said further apertures permitting the entry of said claw to engage perforations of the film when the magazine is in either position with respect to the facing of the projector, a single film gate adjacent the apertured portion of said edge wall, two opposed and generally flat side walls spaced apart by said edge wall, each side wall being apertured in the vicinity of the film gate to permit the insertion of said light-projection element through either side wall into a position behind the film gate, a pair of bobbins mounted for rotation within said casing and each accessible for engagement one at a time with said driving coupling member, the magazine being detachably mounted on said facing with the driving coupling member engaged with that bobbin on to which the film strip is to be wound, means enabling relative movement to be imparted between the support of said film-shifting means and said magazine to move said claw between a position in which said claw can engage the perforations of the film and a position in which said claw is spaced from the film gate, a movable member for retaining the magazine in a fixed position on the facing and means linking said movable member with the support of said film-shifting means, the arrangement being such that movement of said movable member into a position for retaining said magazine on said facing also moves the support of said film-shifting means to the position in which its claw can engage perforations of the film.

7. Projection apparatus for the reproduction of optical records in the form of a perforated film strip bearing two optical records side by side and arranged in opposite directions on the film strip, said projection apparatus including a facing, a light-projecting element projecting from said facing, a driving coupling member, means enabling said driving coupling member to be moved between a retracted position and a position in which it projects from said facing, film-shifting means including a support and a claw mounted for oscillatory movement on said support for engaging the perforations of the film to move the film intermittently through the apparatus, a film magazine comprising a casing including an edge wall having two spaced apertures positioned to register with the two optical records on the film and two further spaced apertures positioned to register with the perforations on the film, said further apertures permitting the entry of said claw to engage perforations of the film when the magazine is in either position with respect to the facing of the projector, a single film gate adjacent the apertured portion of said edge wall, two opposed and generally flat side walls spaced apart by said edge wall, each side wall being apertured in the vicinity of the film gate to permit the insertion of said light-projection element through either side wall into a position behind the film gate, a pair of bobbins mounted for rotation within said casing and each accessible for engagement one at a time with said driving coupling member, the magazine being detachably mounted on said facing with the driving coupling member engaged with that bobbin on to which the film strip is to be wound, means enabling relative movement to be imparted between the support of said film-shifting means and said magazine, to move said claw between a position in which said claw can engage the perforations of the film and a position in which said claw is spaced from the film gate, a movable member for retaining the magazine in a fixed position on the facing, means linking said movable member with the means for moving said driving member between its two positions and means linking said movable member with the support of said film-shifting means, the arrangement being such that movement of said movable member into a position for retaining said magazine on said facing also raises said driving coupling member above said facing and into engagement with one of said bobbins and moves the support of said film-shifting means to the position in which its claw can engage perforations of the film.

8. Projection apparatus according to claim 7, including a further driving coupling member, driving means within the magazine for engagement therewith and for moving the film in a direction from one bobbin through the film gate towards the other bobbin, means enabling said further driving coupling member to be moved between a retracted position and a position in which it projects from the facing and means linking said movable member with the means for moving said further driving coupling member between its two positions, the arrangement being such that movement of said movable member into a position for retaining said magazine on said facing also raises said further driving coupling member above said facing and into engagement with the driving means within the magazine.

9. Projection apparatus for the reproduction of optical records in the form of a perforated film strip bearing two optical records side by side and arranged running in opposite directions on the film strip, said projection apparatus including a facing, a light-projecting element projecting from said facing, a driving coupling member, film-shifting means including a support and a claw mounted for oscillatory movement on said support for engaging the perforations of the film, to move the film intermittently through the apparatus, a film magazine comprising a casing including an edge wall having two spaced apertures positioned to register with the two optical records on the film and two further spaced apertures positioned to register with the perforations on the film, said further apertures permitting the entry of said claw to engage perforations of the film when the magazine is in either position with respect to the facing of the projector, a shutter within the magazine and movable between positions in which the appropriate spaced aperture is open and a position in which both spaced apertures are closed, a single film gate adjacent the apertured portion of said edge wall, two opposed and generally flat side walls spaced apart by said edge wall, each side wall being apertured in the vicinity of the film gate to permit the insertion of said light-projection element through either side wall into a position behind the film gate, a pair of bobbins mounted for rotation within said casing and each accessible for engagement one at a time with said driving coupling member, the magazine being detachably mounted on said facing with the driving coupling member engaged with that bobbin on to which the film strip is to be wound, means enabling relative movement to be imparted between the support of said film-shifting means and said magazine to move said claw between a position in which said claw can engage the perforations of the film and a position in which said claw is spaced from the film gate, a movable member for retaining the magazine in a fixed position on the facing, means linking said movable member with the shutter of the magazine in position on said facing for moving said shutter between its two positions and means linking said movable member with the support of said film-shifting means, the arrangement being such that movement of said movable member into a position for retaining said magazine on said facing also moves the shutter to open the appropriate one of said spaced apertures and moves the support of said film-shifting means to the position in which its claw can engage perforations of the film.

10. Projection apparatus according to claim 9, including means enabling said driving coupling member to be moved between a retracted position and a position in which it projects from said facing, and means linking said movable member with the means for moving said driving coupling member between its two positions, the arrangement being such that movement of said movable member into a position for retaining said magazine on said facing also raises said driving coupling member above said facing and into engagement with one of said bobbins.

11. Projection apparatus for the reproduction of optical records in the form of a perforated film strip bearing two optical records side by side and arranged running in opposite directions on the film strip, said projection apparatus including a facing, a light-projecting element projecting from said facing, a driving coupling member, film-shifting means including a support and a claw mounted for oscillatory movement on said support for engaging the perforations of the film to move the film intermittently through the apparatus, a film magazine comprising a casing including two apertured members one of which is an edge wall of the magazine, each of said apertured members having two corresponding spaced apertures positioned to register with the two optical records on the film and said edge wall having two further spaced apertures positioned to register with the perforations on the film, said further apertures permitting the entry of said claw to engage perforations of the film when the magazine is in either position with respect to the facing of the projector, two shutters movable between positions in which the appropriate pair of spaced apertures are open and positions in which both pairs of spaced apertures are closed, means connecting said shutters together for movement in unison, a single film gate formed by said apertured members, two opposed and generally flat side walls spaced apart by said edge wall, each side wall being apertured in the vicinity of the film gate to permit the insertion of said light-projection element through either side wall into a position behind the film gate, a pair of bobbins mounted for rotation within said casing and each accessible for engagement one at a time with said driving coupling member, the magazine being detachably mounted on said facing with the driving coupling member engaged with that bobbin on to which the film strip is to be wound, means enabling relative movement to be imparted between the support of said film-shifting means and said magazine to move said claw between a position in which said claw can engage the perforations of the film and a position in which said claw is spaced from the film gate, a movable member for retaining the magazine in a fixed position on the facing, means linking said movable member with the shutters of the magazine in position on said facing for moving said shutters and means linking said movable member with the support of said film-shifting means, the arrangement being such that movement of the movable member into position for retaining the magazine on the facing also moves the shutters to open the appropriate spaced aperture and moves the support of said film-shifting means to the position in which its claw can engage perforations of the film.

12. Apparatus for the reproduction of optical records in the form of a perforated film strip bearing two optical records side by side and arranged running in opposite directions on the film strip, said apparatus including a facing, a light-reflecting element projecting from said facing, a film magazine detachably mounted on said facing and including a film-bearing spool, said magazine comprising a casing including an apertured member having two spaced apertures positioned to register with the two optical records on the film, a shutter within the magazine and movable between positions in which the appropriate spaced aperture is open and a position in which both spaced apertures are closed, a single film gate adjacent the apertured portion of said apertured member, two pins fixed to said shutter and disposed so as to project outwardly through two further apertures in said apertured member, two opposed and generally flat side walls spaced apart by said apertured member, each side wall being apertured in the vicinity of the film gate to permit the insertion of said light-reflecting element through either side wall into a position behind the film gate, a movable member for retaining the magazine in a fixed position on the facing and means linking said movable member with the shutter of the magazine including a forked member adapted to engage the appropriate one of the said two pins depending upon the position in which the magazine is located on said facing, the arrangement being such that movement of said movable member into a position for retaining said magazine on said facing also moves the shutter to open the appropriate spaced aperture.

ARTHUR WILLIAM KINGSTON.

(References on following page)

REFERENCES CITED

The following references are of record in the file of this patent:

UNITED STATES PATENTS

| Number | Name | Date |
|---|---|---|
| 1,372,675 | Davis | Mar. 29, 1921 |
| 1,760,219 | Thornton | May 27, 1930 |
| 1,801,061 | Thornton | Apr. 14, 1931 |
| 1,935,572 | Leventhal | Nov. 14, 1933 |
| 1,969,484 | Stewart | Aug. 7, 1934 |
| 2,026,960 | Branch | Jan. 7, 1936 |
| 2,180,639 | McMahon et al. | Nov. 21, 1939 |
| 2,206,134 | Streyckmans | July 2, 1940 |
| 2,211,334 | Lechleitner | Aug. 13, 1940 |
| 2,317,096 | Dunn | Apr. 20, 1943 |
| 2,342,511 | Gaty | Feb. 22, 1944 |

FOREIGN PATENTS

| Number | Country | Date |
|---|---|---|
| 273,360 | Great Britain | June 24, 1927 |